United States Patent

Banerjee et al.

[11] Patent Number: 6,156,451
[45] Date of Patent: *Dec. 5, 2000

[54] PROCESS FOR MAKING COMPOSITE ION EXCHANGE MEMBRANES

[75] Inventors: Shiobal Banerjee, Hockessin, Del.; John Donald Summers, Lumberton, N.C.

[73] Assignee: E. I. du Pont de Nemours and Company, Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,169

[22] Filed: May 2, 1997

Related U.S. Application Data

[63] Continuation-in-part of application No. 08/339,167, Nov. 10, 1994, Pat. No. 5,795,668.

[51] Int. Cl.$^7$ .................................................. H01M 10/24
[52] U.S. Cl. .............................. 429/134; 204/98; 428/198
[58] Field of Search .............................. 204/98; 428/198; 429/134

[56] References Cited

U.S. PATENT DOCUMENTS

| | | | |
|---|---|---|---|
| 4,604,170 | 8/1986 | Miyake | 204/98 |
| 4,954,388 | 9/1990 | Mallouk | 428/198 |
| 5,795,668 | 8/1998 | Banerjee | 429/33 |

*Primary Examiner*—Maria Nuzzolillo
*Assistant Examiner*—M. Wills

[57] ABSTRACT

A process for making a composite ion exchange membrane including fabricating a layered membrane precursor including a microporous support of highly fluorinated nonionic polymer adhered to a layer of highly fluorinated sulfonyl halide polymer, hydrolyzing the layered membrane precursor to convert the highly fluorinated sulfonyl halide polymer to highly fluorinated sulfonate polymer, impregnating the microporous support with a dispersion of highly fluorinated sulfonate polymer or precursor thereof in a polar liquid medium after hydrolyzing, removing the polar liquid medium, and heating to coalesce the highly fluorinated sulfonated polymer in the support.

17 Claims, No Drawings

PROCESS FOR MAKING COMPOSITE ION EXCHANGE MEMBRANES

This application is a continuation-in-part of application Ser. No. 08/339,167, filed Nov. 10, 1994 now U.S. Pat. No. 5,795,668.

FIELD OF THE INVENTION

The present invention relates to a process for making composite ion exchange membranes of highly fluorinated ion exchange polymer combined with a microporous support of highly fluorinated nonionic polymer.

BACKGROUND OF THE INVENTION

Ion exchange polymer membranes have found utility in a number of electrochemical and other processes. One use has been as membranes for solid polymer electrolyte cells. Solid polymer electrolyte cells typically employ a membrane of an ion exchange polymer which serves as a physical separator between the anode and cathode while also serving as an electrolyte. These cells can be operated as electrolytic cells for the production of electrochemical products or they may be operated as fuel cells for the production of electrical energy. Ion exchange polymer membranes are also used for facilitated transport, diffusion dialysis, electrodialysis, pervaporation and vapor permeation separations.

Membranes of highly fluorinated polymers such as perfluorinated sulfonic acid polymer membranes are particularly well-suited for such uses due to excellent chemical resistance, long life, and high conductivity. However, for some applications, the tensile strength of such membranes is not as high as desired and reinforcements are sometimes incorporated into the membranes to increase strength. For example, in membranes used in the chloralkali process, i.e., the production of caustic and chlorine by electrolytic conversion of an aqueous solution of an alkali metal chloride, woven reinforcements are incorporated into the membranes. While woven reinforcements work well in use, the fabrics are expensive and processes for incorporation of the fabrics into the membranes are cumbersome. For other applications such as in fuel cells, increased tensile strength is typically not needed in use but may be desirable for ease of handling or for certain manufacturing operations involving the membranes. Woven fabrics are generally unsuitable for membranes for fuel cells since membranes incorporating fabrics typically do not have the flat surfaces needed for contact with the electrodes employed in use in a fuel cell.

Composite ion exchange membranes have been developed which incorporate porous supports of a highly fluorinated nonionic polymer such as expanded polytetrafluoroethylene (EPTFE) to increase tensile strength and improve dimensional stability. However, the processes known for making such membranes are not particularly suitable for commercial manufacturing operations. For example, U.S. Pat. No. 5,082,472 disloscloses a process for making composite membrane intended for facilitated transport end use. In the process of this patent, the following steps are disclosed:

(1) Melt extrusion of the precursor of a perfluorinated ionomer to form a film;
(2) Lamination of the precursor film to the EPTFE to form a precursor laminate;
(3) Impregnation of the EPTFE component with a dilute (e.g., 2% solids) liquid composition of low equivalent weight ionomer followed by drying; and
(4) Hydrolysis of the ionomer precursor film layer.

U.S. Pat. No. 5,082,472 teaches that the EPTFE side of the composite should preferably be coated with the liquid composition of the ionomer prior to hydrolysis. This patent explains that "[o]therwise, the ionomer film will swell, and the hydrophobic EPTFE will not allow the release of the hydrostatic pressure front the swelling, causing the structure to delaminate locally".

While the process of U.S. Pat. No. 5,082,472 can be used for making individual membranes, it is not easily adapted to larger scale manufacturing processes where processing speed is of high importance, e.g., continuous processes in which the ionomer film and the EPTFE are supplied as roll stock. It is difficult to fully impregnate the EPTFE film with the liquid ionomer composition because both the EPTFE and the ionomer film are hydrophobic. Impregnation times can be unacceptably long and/or voids may remain which adversely affect membrane properties.

SUMMARY OF THE INVENTION

The invention provides a method for making a composite ion exchange membrane including fabricating a layered membrane precursor including a microporous support of highly fluorinated nonionic polymer adhered to a layer of highly fluorinated sulfonyl halide polymer, hydrolyzing the layered membrane precursor to convert the highly fluorinated sulfonyl halide polymer to highly fluorinated sulfonate polymer, impregnating the microporous support with a dispersion of highly fluorinated sulfonate polymer or precursor thereof in a polar liquid medium after hydrolyzing, removing the polar liquid medium, and heating to coalesce the highly fluorinated sulfonated polymer in the support.

In accordance with a preferred form of the present invention, fabricating of the layered membrane precursor is performed under conditions which cause sufficient flow of the highly fluorinated sulfonyl halide polymer to form a consolidated layered membrane precursor that does not delaminate during hydrolyzing. Preferably, the layered membrane precursor is fabricated by laminating a film of highly fluorinated sulfonyl halide polymer to the microporous support at a temperature of at least about 280° C., most preferably at a temperature of at least about 300° C.

In accordance with another preferred form of the present invention, during the impregnating of the microporous support with a dispersion of highly fluorinated sulfonate polymer, the side of the membrane with the highly fluorinated sulfonate polymer layer is contacted with a dry gas to cause at least partial removal of the polar liquid by passage through the layer of highly fluorinated sulfonate polymer. Especially preferred liquid media include alcohols having 1 to 4 carbon atoms and mixtures thereof.

In accordance with another preferred form of the invention, the impregnating is performed such that the microporous support is fully embedded in the highly fluorinated sulfonate polymer.

In accordance with another preferred form of the invention, the layered membrane precursor further comprises a layer of highly fluorinated carboxylate polymer precursor adhered to the side of the highly fluorinated sulfonyl halide polymer layer opposite from the microporous support, the carboxylate polymer precursor being converted to carboxylate polymer during hydrolysis. Preferably, the highly fluorinated carboxylate polymer precursor is highly fluorinated methyl carboxylate polymer. Most preferably, the layered membrane precursor is fabricated by laminating a bifilm of highly fluorinated carboxylate polymer precursor and highly fluorinated sulfonyl halide polymer to the support with the sulfonyl halide polymer contacting the microporous support.

Preferably, the composite ion exchange membranes made by the process have a thickness of 20 µm to about 400 µm, most preferably, 30 µm to about 60 µm.

In accordance with another preferred form of the invention, the microporous support further comprises an attached fabric, most preferably a woven fabric.

Preferably, the the sulfonyl halide polymer used in the process is perfluorinated. It is also preferable for the non-ionic polymer of the microporous support to be perfluorinated. Preferably, the microporous support comprises expanded polytetrafluoroethylene having a microstructure of polymeric fibrils, most preferably, a microstructure of nodes interconnected by the fibrils.

DETAILED DESCRIPTION
Ion Exchange Polymers

The method in accordance with the present invention employs highly fluorinated sulfonate polymer, i.e., having sulfonate functional groups in the resulting composite membrane. "Highly fluorinated" means that at least 90% of the total number of univalent atoms in the polymer are fluorine atoms. Most preferably, the polymer is perfluorinated. The term "sulfonate functional groups" is intended to refer to either to sulfonic acid groups or salts of sulfonic acid groups, preferably alkali metal or ammonium salts. Most preferably, the functional groups are represented by the formula $-SO_3X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. For applications where the polymer is to be used for proton exchange, the sulfonic acid form of the polymer is preferred, i.e., where X is H in the formula above. For use in the chloralkali process, the sodium salt form of the polymer is preferred, i.e., where X is Na in the formula above.

Preferably, the polymer comprises a polymer backbone with recurring side chains attached to the backbone with the side chains carrying the cation exchange groups. Possible polymers include homopolymers or copolymers of two or more monomers. Copolymers are typically formed from one monomer which is a nonfunctional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride ($-SO_2F$), which can be subsequently hydrolyzed to a sulfonate functional group. For example, copolymers of a first fluorinated vinyl monomer together with a second fluorinated vinyl monomer having a sulfonyl fluoride group ($-SO_2F$) can be used. Possible first monomers include tetrafluoroethylene (TFE), hexafluoropropylene, vinyl fluoride, vinylidine fluoride, trifluorethylene, chlorotrifluoroethylene, perfluoro (alkyl vinyl ether), and mixtures thereof. Possible second monomers include a variety of fluorinated vinyl ethers with sulfonate functional groups or precursor groups which can provide the desired side chain in the polymer. The first monomer may also have a side chain which does not interfere with the ion exchange function of the sulfonate functional group. Additional monomers can also be incorporated into these polymers if desired.

A class of preferred polymers for use in the present invention include a highly fluorinated, most preferably perfluorinated, carbon backbone and the side chain is represented by the formula $-(O-CF_2CFR_f)_a-O-CF_2CFR'_fSO_3X$, wherein $R_f$ and $R'_f$ are independently selected from F, Cl or a perfluorinated alkyl group having 1 to 10 carbon atoms, a=0, 1 or 2, and X is H, Li, Na, K or $N(R^1)(R^2)(R^3)(R^4)$ and $R^1$, $R^2$, $R^3$, and $R^4$ are the same or different and are H, $CH_3$ or $C_2H_5$. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula $-O-CF_2CF(CF_3)-O-CF_2CF_2SO_3X$, wherein X is as defined above. Polymers of this type are disclosed in U.S. Pat. No. 3,282,875 and can be made by copolymerization of tetrafluoroethylene (TFE) and the perfluorinated vinyl ether $CF_2=CF-O-CF_2CF(CF_3)-O-CF_2CF_2SO_2F$, perfluoro (3,6-dioxa-4-methyl-7-octenesulfonyl fluoride) (PDMOF), followed by conversion to sulfonate groups by hydrolysis of the sulfonyl halide groups and ion exchanging if needed to convert to the desired form. One preferred polymer of the type disclosed in U.S. Pat. Nos. 4,358,545 and 4,940,525 has the side chain $-O-CF_2CF_2SO_3X$, wherein X is as defined above. This polymer can be made by copolymerization of tetrafluoroethylene (TFE) and the perfluorinated vinyl ether $CF_2=CF-O-CF_2CF_2SO_2F$, perfluoro(3-oxa-4-pentenesulfonyl fluoride) (POPF), followed by hydrolysis and acid exchange if needed.

In preferred forms of the present invention, highly fluorinated carboxylate polymer, i.e., having carboxylate functional groups in the resulting composite membrane, is also employed as will be discussed in more detail hereinafter. The term "carboxylate functional groups" is intended to refer to either to carboxylic acid groups or salts of carboxylic acid groups, preferably alkali metal or ammonium salts. Most preferably, the functional groups are represented by the formula $-CO_2X$ wherein X is H, Li, Na, K or $N(R^1)(R^2)(R^3)(R^4)$ and $R^1$, $R^2$, $R^3$, and $R^4$ are the same or different and are H, $CH_3$ or $C_2H_5$. For use in the chloralkali process, the sodium salt form of the polymer preferred, i.e., where X is Na in the formula above. Preferably, the polymer comprises a polymer backbone with recurring side chains attached to the backbone with the side chains carrying the carboxylate functional groups. Polymers of this type are disclosed in U.S. Pat. No. 4,552,631 and most preferably have the side chain $-O-CF_2CF(CF_3)-O-CF_2CF_2CO_2X$. This polymer can be made by copolymerization of tetrafluoroethylene (TFE) and the perfluorinated vinyl ether $CF_2=CF-O-CF_2CF(CF_3)-O-CF_2CF_2CO_2CH_3$, methyl ester of perfluoro(4,7-dioxa-5-methyl-8-nonenecarboxylic acid) (PDMNM), followed by conversion to carboxylate groups by hydrolysis of the methyl carboxylate groups and ion exchanging if needed to convert to the desired form. While other esters can be used for film or bifilm fabrication, the methyl ester is the preferred since it is sufficiently stable during normal extrusion conditions.

In this application, "ion exchange ratio" or "IXR" is defined as number of carbon atoms in the polymer backbone in relation to the cation exchange groups. A wide range of IXR values for the polymer are possible. Typically, however, the IXR range used for layers of the laminated membrane is usually about 7 to about 33. For perfluorinated polymers of the type described above, the cation exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a perfluorocarbon backbone and the side chain is $-O-CF_2-CF(CF_3)-O-CF_2-CF_2-SO_3H$ (or a salt thereof), the equivalent weight range which corresponds to an IXR of about 7 to about 33 is about 700 EW to about 2000 EW. IXR for this polymer can be related to equivalent weight using the following formula: 50 IXR+344=EW. While generally the same IXR range is used for sulfonate polymers disclosed in U.S. Pat. Nos. 4,358,545 and 4,940,525, the equivalent weight is somewhat lower because of the lower molecular weight of the monomer unit containing a cation exchange group. For the IXR range of about 7 to about 33, the corresponding equivalent weight range is about 500 EW to about 1800 EW. IXR for this polymer can be related to equivalent weight using the following formula: 50 IXR+178=EW. For carboxylate polymers having the side chain —O—$CF_2CF(CF_3)$—O—$CF_2CF_2CO_2X$, a useful IXR range is about 12 to about 21 which corresponds to about 900 EW to about 1350 EW. IXR for this polymer can be related to equivalent weight using the following formula: 50 IXR+308=EW.

IXR is used in this application to describe either hydrolyzed polymer which contains functional groups or unhydrolyzed polymer which contains precursor groups which will subsequently be converted to the functional groups during the manufacture of the membranes.

The highly fluorinated sulfonate polymer used in the process of the invention preferably has ion exchange ratio of about 8 to about 23, more preferably about 9 to about 14 and most preferably about 10 to about 13.

Microporous Supports

The microporous supports useful in a process of the invention are made of highly fluorinated nonionic polymers. As for the ion exchange polymers, "highly fluorinated" means that at least 90% of the total number of halogen and hydrogen atoms in the polymer are fluorine atoms.

For increased resistance to thermal and chemical degradation, the microporous support is preferably is made of a perfluorinated polymer. For example, the polymer for the porous support can be polytetrafluoroethylene (PTFE) or a copolymer of tetrafluoroethylene with

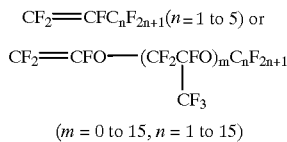

$CF_2$=$CFC_nF_{2n+1}$ ($n$=1 to 5) or $CF_2$=$CFO$—$(CF_2CFO)_mC_nF_{2n+1}$
               $|$
              $CF_3$ ($m$ = 0 to 15, $n$ = 1 to 15)

Microporous PTFE sheeting is well known and is particularly suitable for use as the microporous support. One preferred support is expanded polytetrafluoroethylene polymer (EPTFE) having a microstructure of polymeric fibrils, most preferably, a microstructure of nodes interconnected by the fibrils. Films having a microstructure of polymeric fibrils with no nodes present are also useful. The preparation of such suitable supports is described in U.S. Pat. Nos. 3,953,566 and U.S. 3,962,153. These patents disclose the extruding of dispersion-polymerized PTFE in the presence of a lubricant into a tape and subsequently stretching under conditions which make the resulting material more porous and stronger. Heat treatment of the expanded PTFE under restraint to above the PTFE melting point (approximately 342° C.) increases the amorphous content of the PTFE. Films made in this manner can have a variety of pore sizes and void volumes. U.S. Pat. Nos. 3,953,566, 3,962,153 and 4,187,390 disclose porous PTFE films having at least 35% voids. Pore size can vary but is typically at least about 0.2 $\mu$m. The thickness of the porous support can be varied depending on the type of composite to be made. Preferably, the thickness is about 20 $\mu$m to about 400 $\mu$m, most preferably, 30 $\mu$m to about 60 $\mu$m.

Suitable microporous PTFE supports are available commercially from W. L. Gore & Associates, Elkton Md., under the trademark GORE-TEX® and from Tetratec, Feasterville, Pa., under the trademark TETRATEX®.

Microporous supports made using other manufacturing processes with other highly fluorinated nonionic polymers may also be used in the process of the invention. Such polymers may be selected from the broad spectrum of homopolymers and copolymers made using flurorinated monomers. Possible fluorinated monomers include vinyl fluoride; vinylidene fluoride; trifluoroethylene; chlorotrifluoroethylene (CTFE); 1,2-difluoroethylene; tetrafluoroethylene (TFE); hexafluoropropylene (HFP); perfluoro(alkyl vinyl) ethers such as perfluoro(methyl vinyl) ether (PMVE), perfluoro(ethyl vinyl) ether (PEVE), and perfluoro(propyl vinyl) ether (PPVE); perfluoro(1,3-dioxole); perfluoro(2,2-dimethyl-1,3-dioxole) (PDD); $F(CF_2)_nCH_2OCF$=$CF_2$ wherein n is 1, 2, 3, 4 or 5; $R^1CH_2OCF$=$CF_2$ wherein $R^1$ is hydrogen or $F(CF_2)_m$- and m is 1, 2 or 3; and $R^3OCF$=$CH_2$ wherein $R^3$ is $F(CF_2)_z$- and z is 1, 2, 3 or 4; perfluorobutyl ethylene (PFBE); 3,3,3-trifluoropropene and 2-trifluoromethyl-3,3,3-trifluoro-1-propene.

If desired, the microporous support may also include an attached fabric, preferably a woven fabric. Most preferably, such fabrics are made of a yarn of a highly fluorinated polymer, preferably PTFE. If such fabrics are to be used, they are preferably securely attached to the PTFE support as supplied for use in the process. Suitable woven fabrics include scrims of woven fibers of expanded PTFE, webs of extruded or oriented fluoropolymer or fluoropolymer netting, and woven materials of fluoropolymer fiber. Nonwoven materials include spun-bonded fluoropolymer may also be used if desired.

Process

The process for manufacturing the composite membranes described in accordance with the invention involves a series of steps. The process includes fabricating a layered membrane precursor including a porous support of expanded highly fluorinated nonionic polymer adhered to a layer of highly fluorinated sulfonyl halide polymer. This can be accomplished by a variety of methods including lamination, melt deposition and other methods.

A film of sulfonyl halide polymer such as sulfonyl fluoride polymer for lamination to the support is suitably made by extrusion at a temperature in the range of about 200° C. to about 300° C. Preferable film thicknesses are about 10 $\mu$m to about 250 $\mu$m. For applications such as chloralkali membranes where it is desired for the composite membrane to layer of highly fluorinated carboxylate polymer, a bifilm of a layer of highly fluorinated sulfonyl halide polymer and a layer highly fluorinated carboxylate polymer precursor can be coextruded for subsequent lamination.

A preferred total thickness for the composite ion exchange membrane is about 20 $\mu$m to about 400 $\mu$m, most preferably, about 30 $\mu$m to about 60 $\mu$m.

In a preferred form of the invention, the layered membrane precursor is fabricated under conditions so that sufficient flow of the highly fluorinated sulfonyl halide polymer occurs to form a consolidated layered membrane precursor which does not delaminate during subsequent hydrolysis. Preferably, this is accomplished by laminating the film of highly fluorinated sulfonyl halide polymer to the microporous support at a temperature of at least about 280° C., most preferably at a temperature of at least about 300° C. These temperatures provide thermoplastic flow of the polymer sufficient to form the preferred consolidated layered membrane precursor.

The lamination process is preferably performed under pressure. Pressures in the range of about 0.5 to about 1 atmosphere (about 50 kPa to about 100 kPa) have been found to be suitable. Such pressures are advantageously applied by subjecting the microporous support to a vacuum while keeping the sulfonyl halide polymer film side at atmospheric pressure. Depending on the temperature, contact times can be as little as 5 seconds but generally are less than 90 seconds to avoid overheating and degradation of the polymer.

In the process of the invention, the layered membrane precursor, with or without the additional carboxylate polymer precursor layer, is suitably hydrolyzed using methods known in the art. For example, the membrane may be hydrolyzed to convert it to the sodium sulfonate form by immersing it in 25% by weight NaOH for about 16 hours at a temperature of about 90° C. followed by rinsing the film twice in deionized 90° C. water using about 30 to about 60 minutes per rinse. Another possible method employs an aqueous solution of 6–20% of an alkali metal hydroxide and 5–40% polar organic solvent such as dimethyl sulfoxide with a contact time of at least 5 minutes at 50–100° C. followed by rinsing for 10 minutes. The carboxylate polymer precursor, such as methyl carboxylate polymer, if present, is converted to carboxylate polymer at the same time. After hydrolyzing, the membrane precursor can be converted if desired to another ionic form by contacting the membrane in a bath containing a 1–5% aqueous salt solution containing the desired cation or, to the acid form, by contacting with a 2–20% aqueous acid solution and rinsing. For fuel cell use, the membrane is usually in the sulfonic acid form. For chloralkali membranes, the membrane precursor is typically used in the sodium form.

Impregnation of the microporous support of the hydrolyzed precursor laminate is performed with liquid composition of highly fluorinated sulfonic acid polymer or precursor thereof in a polar liquid medium. By "polar liquid medium" is meant liquids which can be transported by a highly fluorinated sulfonate membrane. Suitable compositions of sulfonic acid polymer in polar media are disclosed in U.S. Pat. Nos. 4,433,082 and 4,453,991 in which polymer particles are dispersed in mixtures of water and alcohols. Preferably, the polar medium contains a high content of an alcohol which facilitates wetting of the microporous support and which is volatile to facilitate the removal of the liquid medium from the membrane. Most preferably, the liquid compositions contain at least about 90% of an alcohol selected from the group consisting of alcohols with 1 to 4 carbon atoms. A suitable concentration of polymer in the liquid medium is about 2 to about 10% by weight. Compositions with high alcohol contents can be made by concentrating the compositions as disclosed in U.S. Pat. Nos. 4,433,082 and 4,453,991 by evaporation and subsequent dilution with the desired alcohol.

Impregnation is performed so that the pores of the microporous support are at least partially filled, but preferably are completely filled with polymer. Most preferably, impregnation is performed so that the microporous support is embedded in the highly fluorinated sulfonate polymer, i.e., an unreinforced layer of the sulfonate polymer is present on the surface of the microporous support.

Impregnation can be carried out using a variety of methods such as dipping, soaking, brushing, painting and spraying as well as using conventional coating methods such as forward roll coating, reverse roll coating, gravure coating, doctor coating, kiss coating etc. In order to impregnate to the desired degree, repeated steps of impregnation and/or removal of the liquid medium (as discussed in more detail hereinafter) may be necessary.

Removal of the liquid medium can be accomplished by heating and the liquid medium can be recycled if desired. Preferably, during the impregnating of the microporous support, the side of the membrane with the highly fluorinated sulfonate polymer layer is contacted with a dry gas to cause at least partial removal of the polar liquid by passage through the layer of highly fluorinated sulfonate polymer. "Dry gas" as used herein is meant a gas which has a sufficiently low content of vapor of the polar liquid medium to cause removal of the medium from the membrane. The sulfonate polymer layer on the membrane thus serves to draw liquid composition into the microporous support and assists with the impregnation process. In addition, the ability to remove the liquid medium by transport through the membrane enables the process to be performed very quickly which is very helpful for continuous processes. One or a series of solvent removal stages can be employed depending on the dispersion application method and other process requirements.

The polymer impregnating the porous support can be coalesced by heating to a temperature which renders the polymer insoluble. While the coalescence temperature varies with the IXR of the polymer and polymer type, typically the membrane should be heated to above about 120° C. A preferred temperature range is about 120 to about 150° C. for compolymers of TFE and PDMOF in the normal IXR ranges employed. For other polymers and for higher IXR values, higher temperatures may be desirable. The time needed coalesce varies with the temperature employed a suitable range has been found to be about one minute to about one hour. Coalescence is conveniently carried out together with or immediately following the removal of the liquid medium if desired.

While the process of the invention can be performed to make discrete pieces of composite membrane, the invention is advantageously carried out by performing some or a number of the steps of the process in a continuous fashion using roll stock. In one preferred form of the process, steps needed to fabricate the layered membrane precursor are combined in to one stage using roll stock of the microporous support and laminating to sulfonyl halide or bifilm film roll stock or by extrusion deposition of the sulfonyl halide polymer, optionally coextruded with the carboxylate polymer precursor. The layer membrane precursor can be wound up using a roll wind-up if desired. Hydrolysis (and acid exchange if used) can be performed in a separate stage by feeding the roll of layered membrane precursor into a hydrolysis bath following by drying and winding up. Impregnation can be performed after hydrolysis in a continuous fashion if desired. Generally, however, it is more advantageous to perform the steps of impregnation, removal of the liquid medium and coalescence of the polymer together as a stage of the process.

The invention is illustrated in the following examples which are not intended to be limiting.

EXAMPLES

Example 1

Composite Membrane for Use in a Fuel Cell

A microporous PTFE film prepared as disclosed in U.S. Pat. Nos. 3,962,153 (Gore) and 3,953,566 (Gore) is used as a microporous support in in the composite membrane. The PTFE film has a nominal thickness of 0.0009 to 0.001 inch (23 μm to 25 μm) and an apparent density of about 0.38 g/cc.

A 0.001 inch (25 μm) thick sulfonyl fluoride polymer film 1080 equivalent weight (15 IXR) is prepared by melt extrusion. The polymer is a copolymer of TFE and PDMOF. The polymer is melt extruded onto a rotating drum, the cast film then being conveyed and co-wound on a steel core with polyethylene as a spacer to prevent self-adhesion of the cast film. Extrusion temperatures are approximately 275° C.

The sulfonyl fluoride film is then laminated to the microporous PTFE film by vacuum lamination at 310° C. The resulting laminate is then exposed to a 22 weight % potassium hydroxide, 7.5 weight % dimethylsulfoxide solution in water at 70° C. for 40 minutes to hydrolyze the laminate to the potassium salt form. The laminate is then rinsed in deionized water and converted to the acid ($H^+$) form by immersion in 10% nitric acid under ambient conditions for 30 minutes. After a final rinse in deionized water, the laminate is dried and conveyed to a wind-up roll for convenient handling and storage.

Squares, 12" on each side, of the laminate are then cut from the roll stock and suspended in a stainless steel frame. The microporous side of the laminate is then sprayed with a liquid composition of 5 weight % perfluorosulfonic acid polymer (copolymer of TFE and PDMOF) having an equivalent weight of 922 (12 IXR) in a 5 weight % water/95 weight % ethyl alcohol mixture until the membrane became translucent. The composite is then dried at 25° C. for 30 minutes. The spray coating cycle is repeated until the membrane retains its clear appearance in the dry state, visually indicating complete deposition of ionomer in the voids of the microporous PTFE film. Typically, a total of 3 spray coat cycles are required to accomplish this. After the final spray coat the membrane, still suspended in the stainless steel frame, is heated under vacuum at 150° C. for 2 hours to remove residual solvent and to coalesce the polymer. The composite membrane is then conditioned by immersion in a 10% nitric acid bath at 100° C. for two hours. The composite membrane emerges from this treatment as a clear and colorless product suitable for membrane electrode assembly (MEA) preparation. The dried thickness is nominally 1.7 mils (43 μm).

A catalyst ink containing a catalyst of platinum supported on carbon particles and perfluorinated sulfonyl fluoride polymer (copolymer of TFE and PDMOF—940 EW, 12 IXR) as binder is prepared in a solvent which is a mixture of perfluoro(methyl-di-n-butyl)amine and perfluoro(tri-n-butylamine) sold under the trademark FLUOROINERT FC-40, by 3M of St. Paul, Minn. Decals are made by coating the ink onto a substrate and drying. Later, the decals are hot pressed on to either side of the composite membrane described above to transfer the catalyst mixture onto the membrane and thus form catalyst coated membrane (CCM) with a 50 $cm^2$ active area and a platinum loading of 0.3 mg platinum/$cm^2$. The CCM is sandwiched between two treated carbon papers with act as gas diffusion backing to form a membrane electrode assembly (MEA).

The MEA is then assembled in a fuel cell fixture and is evaluated for performance in a test station obtained from Los Alamos National Laboratories, Los Alamos, N.M. The measurements are carried out under different experimental conditions of temperature, pressure, reactant and cathode gas compositions. The MEA is evaluated for both instantaneous and steady state performance.

The results are then compared to a control MEA made by a similar procedure but using a commercially-available 2 mil (50 μm) 1100 EW perfluorinated sulfonic acid membrane, available from E. I. du Pont de Nemours and Company under the trademark NAFION® NF112, in place of the composite membrane. A comparison of the steady state performance of the MEAs with the two membranes is as follows under the conditions listed: cell temperature of 80° C., anode/cathode gas stoichiometries of 1.4/2.5 and relative humidities of 100%/50% and gas pressures of 25 psig (170 kPa) on either side. At a current density of 0.8 A/$cm^2$, the composite membrane exhibits a steady voltage of 0.699V and the commercial NAFION® NF112 exhibits 0.678V. The voltages for the two MEA's at a current density of 0.4 A/$cm^2$ are 0.744V and 0.740V respectively.

Example 2

Composite Membrane for Chloralkali Electrolysis

An unsintered expanded microporous PTFE support, prepared as disclosed in U.S. Pat. Nos. 3,962,153 (Gore) and 3,953,566 (Gore) omitting the sintering step, is used as a microporous support in a composite membrane. The EPTFE has a nominal thickness of 4 mil (100 μm) and an apparent density of about 0.38 g/cc with a pore size of 0.2 μm.

A bifilm of 1 mil (25 μm) 1050 EW highly fluorinated carboxylate film adhered to 4 mil (0.004 inch, 100 μm) 1080 EW sulfonyl fluoride film is prepared by coextrusion of the component polymers to make a two layer film. The bifilm is then laminated to the microporous PTFE support by vacuum lamination at 280° C. with the sulfonyl fluoride side of the bifilm contacting the support.

Squares, 5 inch (127 mm) on each side, of the bifilm laminate are then cut from the roll stock. The bifilm laminate is then exposed to a solution of 10 weight % potassium hydroxide, 30 weight % dimethyl sulfoxide and 60 weight % water on a steam bath for 30 minutes to hydrolyze the laminate to the potassium salt form, and washed thoroughly in deionized water.

The PTFE support side of the laminate is then sprayed several times with a liquid composition of 5 weight % perfluorosulfonic acid polymer (copolymer of TFE and PDMOF) having an equivalent weight of 922 (12 IXR) in a 5 weight % water/95 weight % ethyl alcohol mixture until the membrane becomes translucent and allowing the laminate to air dry between treatments. The coating cycle is repeated until the membrane retains its clear appearance in the dry state, visually indicating complete deposition of ionomer in the voids of the EPTFE layer. A total of 4 coating cycles are required to accomplish this. The bifilm laminate is dried for a period of several days at a temperature of 110° C. to remove residual solvent and to fully consolidate the laminate and form a composite membrane suitable for testing electrical performance.

The membrane was then coated with gas release coating according to the teachings of U.S. Pat. No. 4,552,631 (Bissot et al.) on both sides and put into chloralkali cells for testing.

After 94 days continuous cell testing duplicate membranes show 3.04V, 95.3% current efficiency and 3.07V, 96.4% current efficiency. This performance is equivalent to that of good commercial membranes.

What is claimed is:

1. A process for making a composite ion exchange membrane comprising:

fabricating a layered membrane precursor comprising a microporous support of highly fluorinated nonionic polymer adhered to a layer of highly fluorinated sulfonyl halide polymer;

hydrolyzing said layered membrane precursor to convert said highly fluorinated sulfonyl halide polymer to highly fluorinated sulfonate polymer;

impregnating said microporous support with a dispersion of highly fluorinated sulfonate polymer or precursor thereof in a polar liquid medium after said hydrolyzing;

removing said polar liquid medium; and heating to coalesce the highly fluorinated sulfonate polymer in said support;

said highly fluorinated sulfonate polymer layer being contacted with a dry gas during said impregnating of said microporous support with said dispersion to cause at least partial removal of said polar liquid medium by passage through said layer, said removal of said polar liquid medium through said highly fluorinated sulfonated polymer layer assisting said impregnating of said dispersion into said porous layer.

2. The process of claim 1 wherein said fabricating of said layered membrane precursor is performed under conditions which causes sufficient flow of said highly fluorinated sulfonyl halide polymer to form a consolidated layered membrane precursor that does not delaminate during said hydrolyzing.

3. The process of claim 1 wherein said precursor is fabricated by laminating a film of highly fluorinated sulfonyl halide polymer to said microporous support at a temperature of at least 280° C.

4. The process of claim 3 wherein said layered membrane precursor is heated to a temperature of at least 300° C. during said laminating.

5. The process of claim 1 wherein said polar medium is selected from the group consisting of alcohols having 1 to 4 carbon atoms and mixtures thereof.

6. The process of claim 1 wherein said impregnating is performed such that said microporous support is fully embedded in said highly fluorinated sulfonate polymer.

7. The process of claim 1 wherein said layered membrane precursor further comprises a layer of highly fluorinated carboxylate polymer precursor adhered to the side of said highly fluorinated sulfonyl halide polymer layer opposite from said microporous support, said carboxylate polymer precursor being converted to carboxylate polymer during said hydrolyzing.

8. The process of claim 7 wherein said highly fluorinated carboxylate polymer precursor is highly fluorinated methyl carboxylate polymer.

9. The process of claim 8 wherein said layered membrane precursor is fabricated by laminating a bifilm of highly fluorinated carboxylate polymer precursor and highly fluorinated sulfonyl halide polymer to said support with said sulfonyl halide polymer contacting said microporous support.

10. The process of claim 1 wherein said composite ion exchange membrane has a thickness of about 20 μm to about 400 μm.

11. The process of claim 1 wherein said composite ion exchange membrane has a thickness of about 30 μm to about 60 μm.

12. The process of claim 1 wherein said microporous support further comprises an attached fabric.

13. The process of claim 12 wherein said fabric is woven.

14. The process of claim 1 wherein said sulfonyl halide polymer is perfluorinated.

15. The process of claim 1 wherein said nonionic polymer of said microporous support is perfluorinated.

16. The process of claim 15 wherein said microporous support comprises expanded polytetrafluoroethylene having a microstructure of polymeric fibrils.

17. The process of claim 16 wherein said microporous support has a microstructure of nodes interconnected by said fibrils.

* * * * *